US012561992B2

(12) United States Patent
Yuan et al.

(10) Patent No.: US 12,561,992 B2
(45) Date of Patent: Feb. 24, 2026

(54) SYSTEMS AND METHODS FOR FACILITATING CLONE SELECTION

(71) Applicant: AMGEN INC., Thousand Oaks, CA (US)

(72) Inventors: Yu Yuan, Chicago, IL (US); Graham F. Milne, Ventura, CA (US); Tony Y. Wang, League City, TX (US); Kim H. Le, Thousand Oaks, CA (US); Glenn Tan, Thousand Oaks, CA (US)

(73) Assignee: AMGEN INC., Thousand Oaks, CA (US)

( * ) Notice: Subject to any disclaimer, the term of this patent is extended or adjusted under 35 U.S.C. 154(b) by 254 days.

(21) Appl. No.: 17/296,570

(22) PCT Filed: Nov. 26, 2019

(86) PCT No.: PCT/US2019/063177
§ 371 (c)(1),
(2) Date: May 25, 2021

(87) PCT Pub. No.: WO2020/112723
PCT Pub. Date: Jun. 4, 2020

(65) Prior Publication Data
US 2022/0012465 A1     Jan. 13, 2022

Related U.S. Application Data

(60) Provisional application No. 62/774,154, filed on Nov. 30, 2018.

(51) Int. Cl.
*G06V 20/69* (2022.01)
*G06F 18/2413* (2023.01)
(Continued)

(52) U.S. Cl.
CPC ........ *G06V 20/695* (2022.01); *G06F 18/2413* (2023.01); *G06V 10/764* (2022.01);
(Continued)

(58) Field of Classification Search
None
See application file for complete search history.

(56) References Cited

U.S. PATENT DOCUMENTS 6,246,785 B1     6/2001   Molnar et al.
2002/0076744 A1   6/2002   Koller et al.
(Continued)

FOREIGN PATENT DOCUMENTS

CN     103842769 A     6/2014
CN     104838012 A   *   8/2015 .............. C12M 1/34
(Continued)

OTHER PUBLICATIONS

Peng et al., "Immune Clonal Algorithm Based Feature Selection for Epileptic EEG Signal Classification", 2012 11th International Conference, IEEE, Jul. 2, 2012, pp. 848-853.
(Continued)

*Primary Examiner* — Bernard Krasnic
(74) *Attorney, Agent, or Firm* — MARSHALL, GERSTEIN & BORUN LLP

(57) ABSTRACT

A method for facilitating clone selection includes generating time-sequence images of a well containing a medium, including a first image and a later, second image. The method also includes detecting, by one or more processors analyzing the first image, one or more candidate objects depicted in the first image, and, for each of the candidate objects, determining whether the object is a single cell by analyzing an image of the object using a convolutional neural network. The method further includes detecting, by analyzing the second image with the processor(s), a cell (Continued)

800

GENERATE TIME-SEQUENCE IMAGES OF WELL CONTAINING MEDIUM — 802

DETECT ONE OR MORE CANDIDATE OBJECTS BY ANALYZING FIRST TIME-SEQUENCE IMAGE — 804

FOR EACH CANDIDATE OBJECT, DETERMINE, BY ANALYZING IMAGE OF CANDIDATE OBJECT USING A CNN, WHETHER CANDIDATE OBJECT IS A SINGLE CELL — 806

DETECT CELL COLONY BY ANALYZING SECOND TIME-SEQUENCE IMAGE — 808

DETERMINE WHETHER CELL COLONY WAS FORMED FROM ONLY ONE CELL BASED AT LEAST ON WHETHER EACH CANDIDATE OBJECT WAS DETERMINED TO BE A SINGLE CELL — 810

GENERATE OUTPUT DATA INDICATING WHETHER CELL COLONY WAS FORMED FROM ONLY ONE CELL — 812 colony depicted in the second image, and determining, by the processor(s), whether the colony was formed from only one cell based at least on whether each candidate object was determined to be a single cell. The method further includes generating, by the processor(s), output data indicating whether the colony was formed from only one cell.

22 Claims, 9 Drawing Sheets

(51) Int. Cl.
*G06V 10/764* (2022.01)
*G06V 10/82* (2022.01)

(52) U.S. Cl.
CPC ............ *G06V 10/82* (2022.01); *G06V 20/693* (2022.01); *G06V 20/698* (2022.01)

(56) References Cited

U.S. PATENT DOCUMENTS

| | | | |
|---|---|---|---|
| 2012/0134571 A1 | 5/2012 | Ito et al. | |
| 2015/0087240 A1* | 3/2015 | Loewke | G06T 7/143 |
| | | | 455/67.11 |
| 2015/0268249 A1* | 9/2015 | Mann | C12M 23/12 |
| | | | 506/9 |
| 2018/0106713 A1* | 4/2018 | Koehn | C12M 47/12 |
| 2021/0293691 A1* | 9/2021 | Dayrell-Armes | G06V 10/82 |

FOREIGN PATENT DOCUMENTS

| | | | | |
|---|---|---|---|---|
| CN | 108596046 A | 9/2018 | | |
| EP | 2682187 A1 * | 1/2014 | ............ | C12M 33/06 |
| EP | 2708890 A1 | 3/2014 | | |
| JP | 2007133859 A | 5/2007 | | |
| JP | 2016026500 A | 2/2016 | | |
| WO | WO-91/15826 A1 | 10/1991 | | |
| WO | WO-2011/016189 A1 | 2/2011 | | |
| WO | WO-2013019984 A1 | 2/2013 | | |
| WO | WO-2018213709 A1 | 11/2018 | | |

OTHER PUBLICATIONS

Search Report and Written Opinion in International Application No. PCT/US2019/063177 dated Mar. 16, 2020, 14 pages.
Chilean Patent Application No. 202101409, Office Action and Search Report, issued Jul. 28, 2022.
European Patent Application No. 19824078.0, Communication Pursuant to Article 94(3) EPC, dated Feb. 23, 2023.
Eurasian Patent Application No. 2021191499, Office Action, mailed May 27, 2022.
Japanese Patent Application No. 2021-529789, Notice of Rejection, mailed Aug. 29, 2023.
Caicedo et al., Data-analysis strategies for image-based cell profiling, Nat Methods 14:849-63 (2017).
Singapore Patent Application No. 11202105399R, Written Opinion, dated Oct. 14, 2024.
Chinese Patent Application No. 201980077951.X, Office Action, mailed Mar. 1, 2025.

* cited by examiner

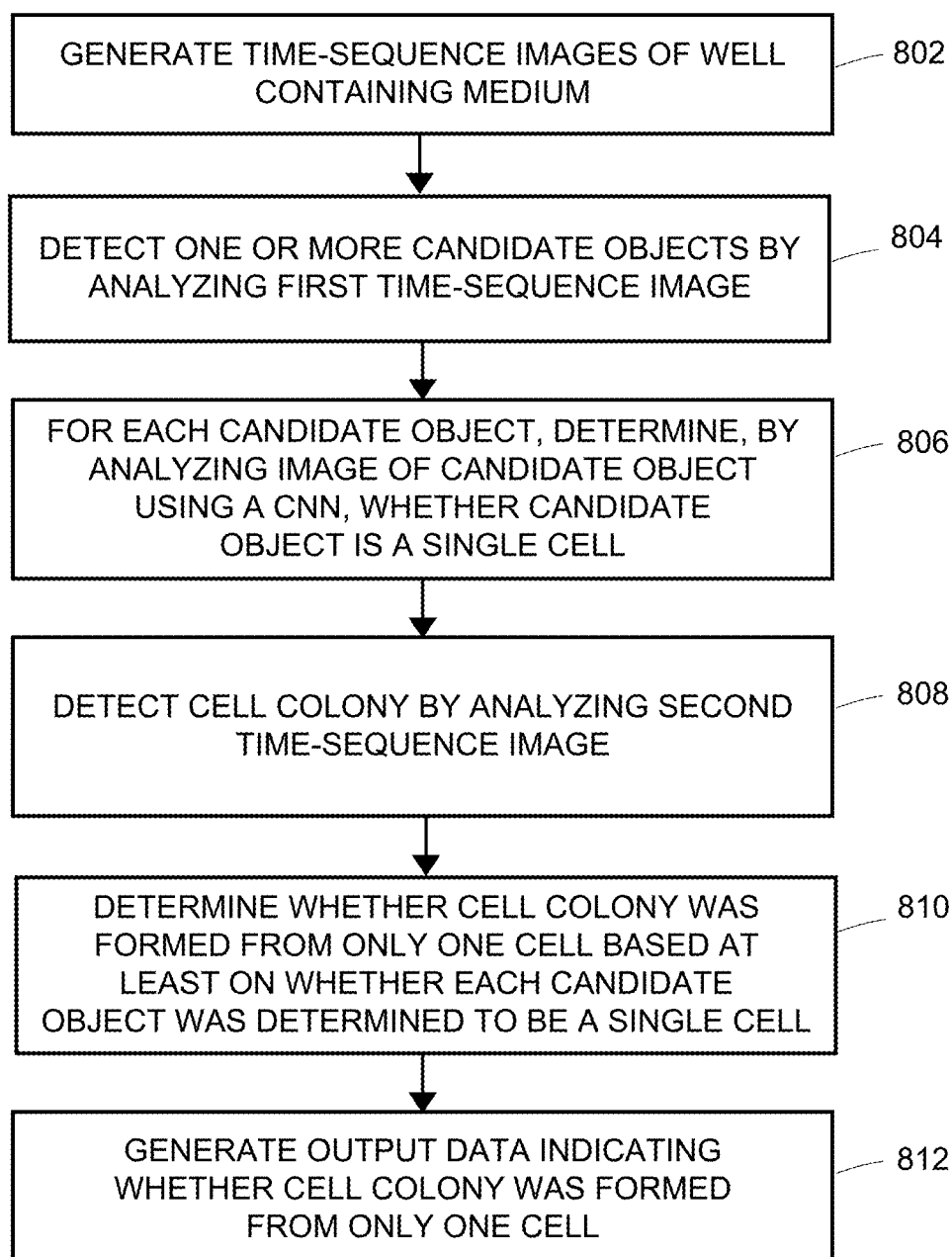

GENERATE TIME-SEQUENCE IMAGES OF WELL CONTAINING MEDIUM — 802

DETECT ONE OR MORE CANDIDATE OBJECTS BY ANALYZING FIRST TIME-SEQUENCE IMAGE — 804

FOR EACH CANDIDATE OBJECT, DETERMINE, BY ANALYZING IMAGE OF CANDIDATE OBJECT USING A CNN, WHETHER CANDIDATE OBJECT IS A SINGLE CELL — 806

DETECT CELL COLONY BY ANALYZING SECOND TIME-SEQUENCE IMAGE — 808

DETERMINE WHETHER CELL COLONY WAS FORMED FROM ONLY ONE CELL BASED AT LEAST ON WHETHER EACH CANDIDATE OBJECT WAS DETERMINED TO BE A SINGLE CELL — 810

GENERATE OUTPUT DATA INDICATING WHETHER CELL COLONY WAS FORMED FROM ONLY ONE CELL — 812

*FIG. 8*

SYSTEMS AND METHODS FOR FACILITATING CLONE SELECTION

FIELD OF DISCLOSURE

The present application relates generally to clone selection techniques, and more specifically relates to techniques for determining whether a cell colony has formed from a single clone/cell.

BACKGROUND

In various cell line development processes, clone selection requires knowledge of whether a cell colony formed from a single clone cell. For example, individual cells may be inoculated into separate wells (e.g., of a 96-well plate) by a flow cytometry technique such as a fluorescence-activated cell sorting (FACS) technique, followed by incubation of the cells for a suitable time period (e.g., 14 days). Throughout the incubation period, digital images of the wells are captured at suitable time intervals, such as every day, or every seven days, etc. An analyst reviews the well images captured at the end of the incubation period (e.g., the 14th day) in order to identify cell colonies and, if a particular well contains a colony, the analyst may also review one or more earlier images of that same well (e.g., an image captured on the first day of incubation) to determine whether the colony formed from only a single clone. If the analyst can confirm that the colony formed from a single clone, that particular sample may be forwarded to one or more additional stages of the cell line development process. If not, the sample may be discarded.

This process is very time consuming and tedious. It is not unusual, for example, for a single project to require hundreds of man-hours spent analyzing microscopic images. Moreover, it can be difficult for an analyst to accurately identify a single cell within a well when attempting to identify a progenitor of a colony. For example, lack of focus on an imaged object may result in a false positive (i.e., incorrectly labeling an object as a single cell). As another example, doublets or "stacked" cells can be difficult to distinguish from single cells. False positives (and/or false negatives) can also result from other factors, such as debris, shadows created by the well wall, and/or aberrations on the inner periphery of the well wall.

SUMMARY

Embodiments described herein relate to systems and methods that improve upon traditional visual inspection techniques used for clone selection. In particular, in some embodiments, an automated visual inspection system captures a series of digital images, for each well within a well plate, at intervals over an incubation period (e.g., days or weeks). Depending on the embodiment, the images may be captured only on the first and last days of the incubation period, on a daily basis, or on some other suitable time schedule. The system may identify candidate object colonies that came from a single cell. Based on identified candidate objects, the system may move the position of a well for further image capture. A cell from a well identified as comprising a colony that came from a single cell may be transferred to a new culture environment and cultured. As used herein "well" refers to any laboratory-scale cell culture environment that permits optical inspection of its contents. While wells on multi-well plates are discussed by way of example herein, it will be appreciated that wherever a "well"

and a "well plate" are mentioned, unless stated otherwise, these terms are contemplated to encompass any suitable laboratory-scale cell culture environment permitting optical inspection of its contents.

For a given well, a computer image processing technique may be applied to a later image (e.g., an image captured on the last day of the incubation period) to determine whether the well contains a cell colony. For example, a convolutional neural network (CNN) may be used to classify an object within the well medium as a cell colony. The CNN may include any suitable number of convolutional layers for two-dimensional convolution (e.g., to detect features such as edges within images), pooling layers (e.g., a down-sampling layer, to reduce computation while preserving the relative locations of features), and fully-connected layers. Alternatively, one or more other image processing techniques may be used to detect a colony, such as conventional image filtering, edge detection, and/or pattern detection techniques. If a cell colony is detected within the well, one or more earlier images of the well (e.g., an image from the first day of incubation) may be analyzed to determine whether the colony formed from a single clone/cell. This determination may involve multiple steps. First, an image of the entire well is analyzed to identify any objects within the well that are candidates for being single cells (e.g., objects that are neither too large nor too small to be a single cell). An image of each candidate object is then input to a CNN (e.g., a second CNN, if a first CNN was used to detect the cell colony) that classifies the candidate object according to object type. In some embodiments, the image of each candidate object comprises or consists of simply a set of pixels that was extracted from the image of the entire well and depicts that candidate object. In some embodiments, the image of each candidate object further comprises a zoomed-in image of the candidate object, e.g., to overcome image resolution limitations associated with currently available imaging technology. For example, a first, lower-magnification imaging unit may be used to capture the image of the entire well for purposes of identifying the candidate objects, while a second, higher-magnification imaging unit may be used to capture zoomed-in images of each identified candidate object. Use of the second imaging unit may further comprise disposing the well or a portion of the well in an optical path of the second imaging unit, for example by shifting the well plate by small distances in the x and/or y directions.

For a given candidate object, the CNN may output a binary classification (e.g., "single cell" versus "not a single cell"), or may classify the object according to one of three or more types (e.g., "single cell," "doublet," "empty cell," "debris," etc.). If a candidate object is classified as a single cell (or another class that corresponds to a single, living cell), it may be determined that the cell colony derived from that cell. This determination may also rely on one or more other factors, such as the position of the single cell within the well as compared to the position of the detected cell colony within the well. Moreover, in some embodiments, one or more additional images of the well, corresponding to one or more other times during the incubation period, may be analyzed to confirm that the cell colony was formed from the single cell. For example, the additional image(s) may be processed to detect one or more interim growth stages of the cell colony.

If it cannot be determined that the cell colony was formed from the single cell, the sample within that well may be discarded. If a single-cell origin can be determined, however (e.g., with at least some threshold level of accuracy, such as 90%, or 99%, etc.), the sample may be forwarded to one or more additional stages of a cell line development process. For example, a cell of the sample (e.g., as a single cell, and/or as part of a portion of the sample comprising the cell, which may also comprise other cells) may be transferred to a new culture environment and cultured. The cell line may be used for any of a wide range of purposes, depending on the embodiment. For example, the cell line may be used to provide cells that produce antibodies or hybrid molecules for a biopharmaceutical product (e.g., drugs containing bispecific T cell engager (BITE®) antibodies, such as BLIN-CYTO® (blinatumomab), or monoclonal antibodies, etc.), or to provide cells for research and/or development purposes. "Accuracy" has its ordinary and customary meaning as would be understood by one of ordinary skill in the art in view of this disclosure. It refers to a probability that a result is neither a false negative or a false positive. For example, accuracy can be calculated as 100%—(type I error)—(type II error).

BRIEF DESCRIPTION OF THE DRAWINGS

The skilled artisan will understand that the figures, described herein, are included for purposes of illustration and do not limit the present disclosure. The drawings are not necessarily to scale, and emphasis is instead placed upon illustrating the principles of the present disclosure. It is to be understood that, in some instances, various aspects of the described implementations may be shown exaggerated or enlarged to facilitate an understanding of the described implementations. In the drawings, like reference characters throughout the various drawings generally refer to functionally similar and/or structurally similar components.

FIG. 1 is a simplified block diagram of an example system that may implement the techniques described herein.

FIG. 8 is a flow diagram of an example method for facilitating clone selection.

DETAILED DESCRIPTION

The various concepts introduced above and discussed in greater detail below may be implemented in any of numerous ways, and the described concepts are not limited to any particular manner of implementation. Examples of implementations are provided for illustrative purposes.

Figure 1:
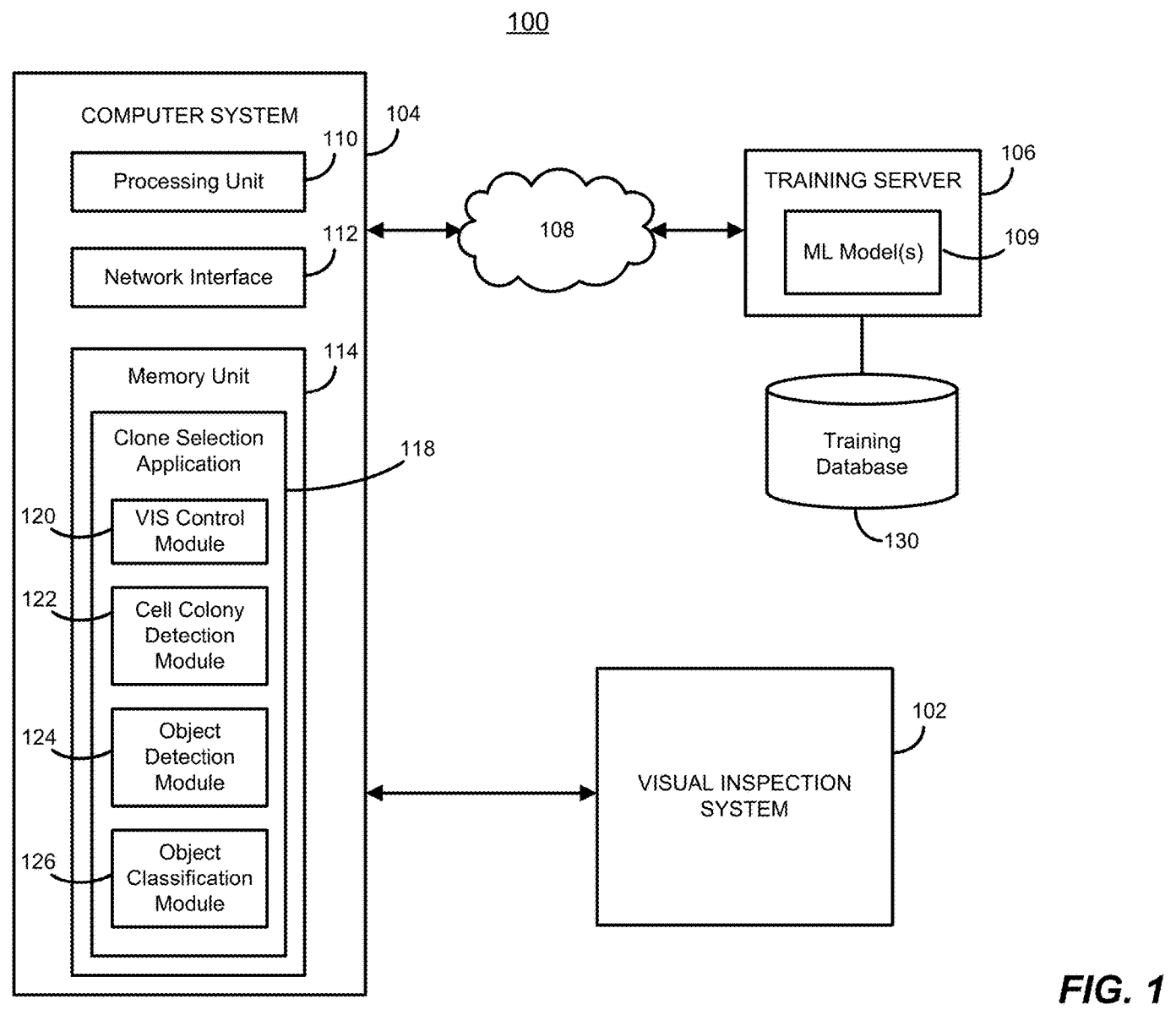
Figure 2A:
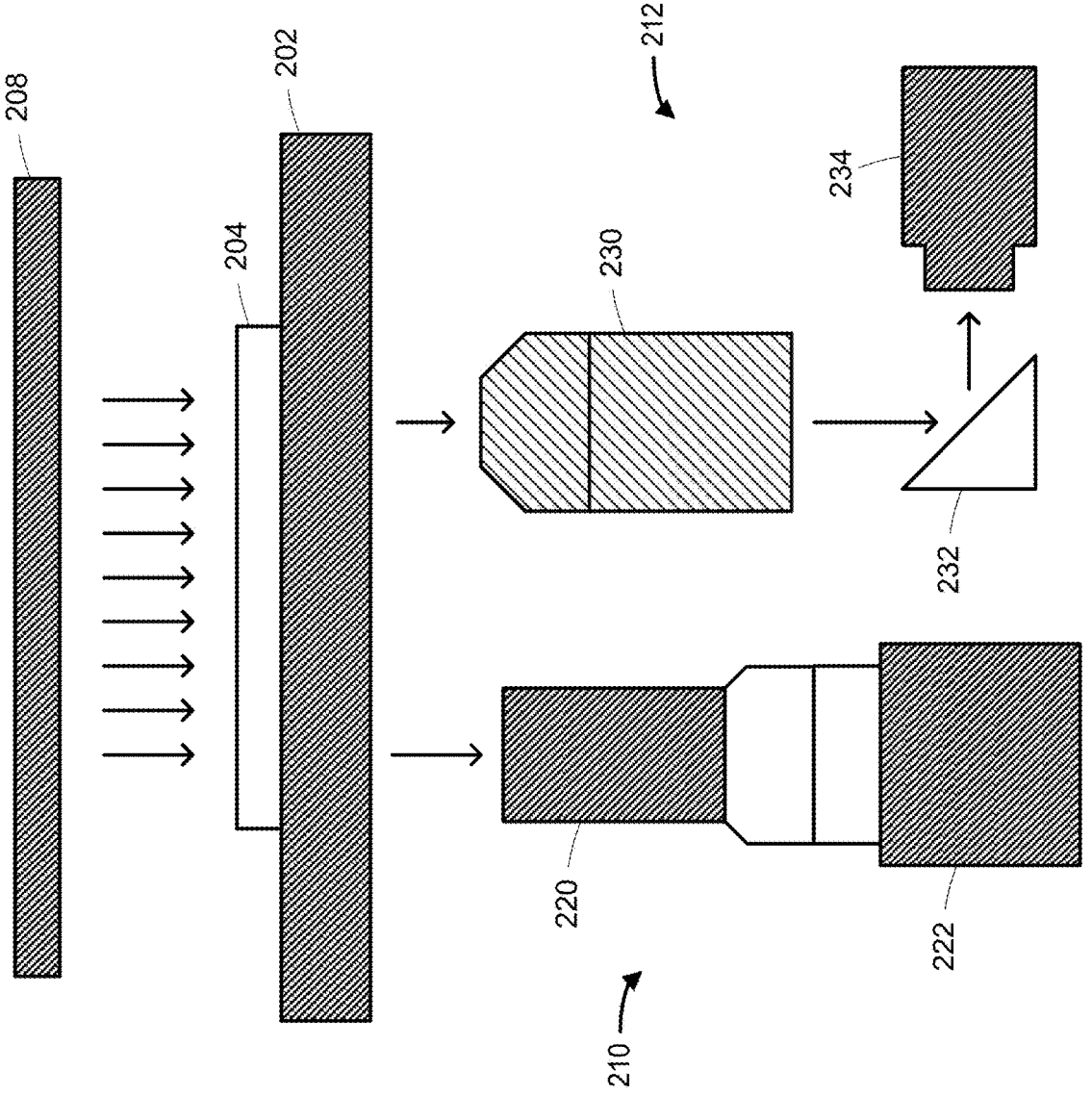
FIGS. 2A-2C depict an example visual inspection system that may be used in the system of FIG. 1.
Figure 2C:
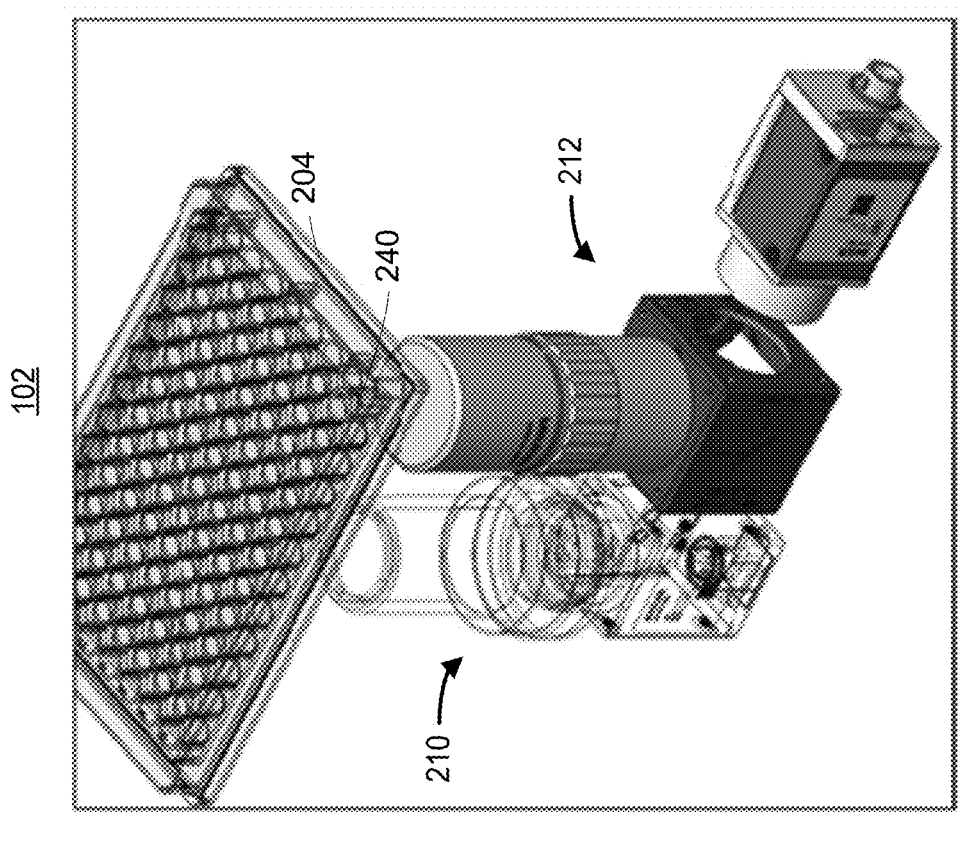
Figure 2B:
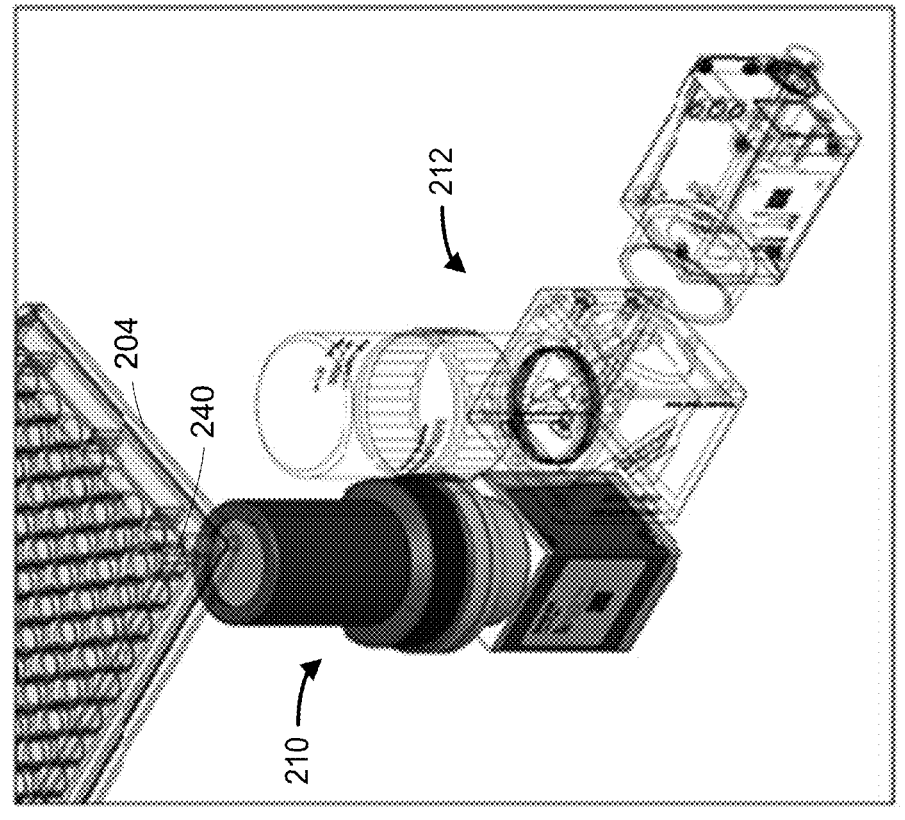

FIG. 1 is a simplified block diagram of an example system 100 that may implement the techniques described herein. System 100 includes a visual inspection system 102 communicatively coupled to a computer system 104. Visual inspection system 102 includes hardware (e.g., a well plate stage, one or more lenses and/or mirrors, an imager, etc.), as well as firmware and/or software, that is configured to capture digital images of wells within a well plate. An example embodiment of visual inspection system 102 is shown in FIGS. 2A through 2C. Referring first to FIG. 2A, visual inspection system 102 may include a stage 202 that is configured to receive a well plate 204 containing a number of wells (not shown in FIG. 2A). Well plate 204 may be any suitable size, any suitable shape, and have any suitable number of wells disposed thereon (e.g., 6, 24, 96, 384, 1536, etc.). Moreover, the wells may be arranged in any suitable pattern on well plate 204, such as a 2:3 rectangular matrix, for example.

Visual inspection system 102 further includes an illumination system 208, a first imager 210 that is configured to acquire wide-field images and, in some embodiments (for purposes discussed further below), a second imager 212 that is configured to acquire high-magnification images. In other embodiments, visual inspection system may omit imager 212. Illumination system 208 may include any suitable number and/or type(s) of light source(s) configured to generate source light, and illuminates each well in well plate 204 when that well is positioned in the optical path of imager 210 or imager 212. Imager 210 comprises a telecentric lens 220 and a wide-field camera 222. Telecentric lens 220 may be a 1× magnification, high-fidelity telecentric lens, and wide-field camera 222 may be a charge-coupled device (CCD) camera, for example. Imager 210 is configured, and positioned relative to stage 202, such that it can capture images the each depict an entire single well (at a resolution suitable to resolve a candidate object in the well from the rest of the well, for example with the single well occupying substantially all of the image or at least a majority of the image), when the well is appropriately positioned on stage 202 and illuminated by illumination system 208. Imager 212 comprises an objective lens 230, a mirror 232, and a high-resolution camera 234. Objective lens 230 may be a 20x magnification, long-working distance objective lens (or lens system), and high-resolution camera 234 may be another CCD, for example. Mirror 232 may allow imager 212 to have a suitably low profile.

In some embodiments, each of the wells in well plate 204 has one or more transparent and/or opaque portions. For example, each of the wells may be entirely transparent, or may have transparent bottoms with the side walls being opaque. Each of the wells may generally be cylindrical, or have any other suitable shape (e.g., a cube, etc.). Visual inspection system 102 images wells of well plate 204, for example imaging each of the wells in well plate 204 sequentially. To this end, visual inspection system 102 is configured to move stage 202 along one or more (e.g., x and y) axes to successively align each of the wells with the illumination system 208 and the optical path of imager 210 for individual well analysis. For example, stage 202 may be coupled to one or more motorized actuators. As each of the wells is aligned with illumination system 208 and the optical path of imager 210, the imager acquires one or more images of the illuminated well. Any cells in a given well may generally lie in a flat plane on the base of the well, in which case the well may be imaged from a top-down or bottom-up perspective. In such embodiments, visual inspection system 102 may also be configured move stage 202 in the vertical (z) direction to maintain focus on the flat, thin layer in which cells may reside. Actuation in the vertical direction may also allow for three-dimensional scanning of a well sample (e.g., to detect cells that are stuck to the side wall of the well, above the well base). Visual inspection system 102 may also apply any suitable technique(s) to mitigate vibration, and/or to mechanically support high-fidelity imaging, both of which may be important if high-magnification imaging is used.

FIGS. 2B and 2C depict the configuration of visual inspection system 102 when imager 210 and imager 212, respectively, are used to capture an image of a particular well (in this scenario, well 240, which is located at one corner of well plate 204). Some components of visual inspection system 102 are omitted in FIGS. 2B and 2C, for clarity. As seen in FIGS. 2B and 2C, well 240 can be selectively positioned in the optical path of imager 210 or imager 212 by moving stage 202 (for viewability, stage 202 is not explicitly shown in FIGS. 2B and 2C, though suitable positioning of stage 202 will be appreciated; See, e.g., FIG. 2A) relative to imagers 210 and 212. In various embodiments, this may be accomplished by moving stage 202, or by moving imagers 210 and 212.

It is understood that FIGS. 2A through 2C show only one example embodiment of visual inspection system 102, and that others are possible. For example, visual inspection system 102 may include additional imagers similar to imager 210 and/or 212 (e.g., for three-dimensional imaging). As further examples, visual inspection system 102 may instead illuminate samples using oblique illumination sources rather than backlighting, or may instead be configured to utilize fluorescence imaging or phase-contrast based imaging. Moreover, while not shown in FIGS. 2A through 2C, visual inspection system 102 may include one or more communication interfaces and processors to enable communication with computer system 104, and to provide local control of the operations of stage 202, illumination system 208, and/or imagers 210 and 212 (e.g., in response to commands received from computer system 104).

Referring again now to FIG. 1, computer system 104 is generally configured to control/automate the operation of visual inspection system 102, and to receive and process images captured/generated by visual inspection system 102, as discussed further below. Computer system 104 is also coupled to a training server 106 via a network 108. Network 108 may be a single communication network, or may include multiple communication networks of one or more types (e.g., one or more wired and/or wireless local area networks (LANs), and/or one or more wired and/or wireless wide area networks (WANs) such as the Internet). As discussed further below, training server 106 is generally configured to train one or more machine learning (ML) models 109, which training server 106 sends to computer system 104 via network 108 to enable computer system 104 to detect and/or classify objects in images generated by visual inspection system 102. In various embodiments, training server 106 may provide ML model(s) 109 as a "cloud" service (e.g., Amazon Web Services), or training server 106 may be a local server. In an alternative embodiment, ML model(s) 109 is/are transferred to computer system 104 by a technique other than a remote download (e.g., by physically transferring a portable storage device to computer system 104), in which case system 100 may not include network 108. In other embodiments, one, some or all of ML model(s) 109 may be trained on computer system 104, and then uploaded to server 106. In other embodiments, computer system 104 itself performs the model training, in which case system 100 may omit both network 108 and training server 106. In still other embodiments, some or all of the components of computer system 104 shown in FIG. 1 (e.g., one, some or all of modules 120 through 126) are instead included in visual inspection system 102, in which case visual inspection system 102 may communicate directly with training server 106 via network 108.

Computer system 104 may be a general-purpose computer that is specifically programmed to perform the operations discussed herein, or may be a special-purpose computing device. As seen in FIG. 1, computer system 104 includes a processing unit 110, a network interface 112 and a memory unit 114. In some embodiments, however, computer system 104 includes two or more computers that are either co-located or remote from each other. In these distributed embodiments, the operations described herein relating to processing unit 110, network interface 112 and/or memory unit 114 may be divided among multiple processing units, network interfaces and/or memory units, respectively.

Processing unit 110 includes one or more processors, each of which may be a programmable microprocessor that executes software instructions stored in memory 114 to execute some or all of the functions of computer system 104 as described herein. Processing unit 110 may include one or more graphics processing units (GPUs) and/or one or more central processing units (CPUs), for example. Alternatively, or in addition, some of the processors in processing unit 110 may be other types of processors (e.g., application-specific integrated circuits (ASICs), field-programmable gate arrays (FPGAs), etc.), and some of the functionality of computer system 104 as described herein may instead be implemented in hardware. Network interface 112 may include any suitable hardware (e.g., a front-end transmitter and receiver hardware), firmware, and/or software configured to communicate with training server 106 via network 108 using one or more communication protocols. For example, network interface 112 may be or include an Ethernet interface, enabling computer system 104 to communicate with training server 106 over the Internet or an intranet, etc. Memory unit 114 may include one or more volatile and/or non-volatile memories. Any suitable memory type or types may be included, such as read-only memory (ROM), random access memory (RAM), flash memory, a solid-state drive (SSD), a hard disk drive (HDD), and so on. Collectively, memory unit 114 may store one or more software applications, the data received/used by those applications, and the data output/generated by those applications.

Memory unit 114 stores the software instructions of a clone selection application 118 that, when executed by processing unit 110, identifies wells/samples in which a cell colony has developed from a single clone. While various modules of application 118 are discussed below, it is understood that those modules may be distributed among different software applications, and/or that the functionality of any one such module may be divided among different software applications.

A visual inspection system (VIS) control module 120 of application 118 controls/automates operation of visual inspection system 102, via commands or other messages, such that images of samples within the wells of well plate 204 can be generated with little or no human interaction. Visual inspection system 102 may send the captured images to computer system 104 for storage in memory unit 114, or another suitable memory not shown in FIG. 1.

A cell colony detection module 122 of application 118 attempts to identify/detect any cell colonies depicted in the well images received from visual inspection system 102. Cell colony detection module 122 may detect cell colonies using a machine learning model such as a convolutional neural network (CNN), for example, or using a non-machine learning algorithm (vision analysis software) that detects colonies without requiring any training. The operation of cell colony detection module 122 is discussed in further detail herein.

An object detection module 124 of application 118 attempts to identify/detect any individual objects that (1) are depicted in the well images received from visual inspection system 102, and (2) could potentially be single cells. However, due to limitations of the model or algorithm employed by object detection module 124, and/or due to limitations in the resolution of the images processed by object detection module 124, object detection module 124 may be unable to ascertain, with sufficient accuracy or confidence, whether each detected object is in fact a single cell. Thus, each object detected by object detection module 124 is initially viewed only as a "candidate" for being a single cell. Object detection module 124 may detect objects using a relatively simple machine learning model, or using a non-machine learning algorithm (vision analysis software) that detects objects without requiring any training. In some embodiments, object detection module 124 utilizes OpenCV to process images, and to detect objects therein. In some embodiments, object detection module 124 only outputs objects that are above a minimum threshold size and/or below a maximum threshold size (e.g., threshold pixel widths or threshold numbers of pixels, etc.), to avoid identifying objects that could not possibly be a single cell. For example, a minimum threshold size may filter out dead pixels in the image and very small contaminants, while a maximum threshold size may filter out very large contaminants or bubbles, etc. The operation of object detection module 124 is discussed in further detail herein.

An object classification module 126 of application 118 attempts to classify the individual objects detected by object detection module 124. In some embodiments, object classification module 126 processes subsets of the same well images that were processed by object detection module 124. For example, object detection module 124 may accept subsets of image pixels as an input, where each subset corresponds to a single candidate object (possibly also including pixels that correspond to a small area surrounding the candidate object). In such embodiments, visual inspection system 102 may not include imager 212. Alternatively, VIS control module 120 may cause visual inspection system 102 to capture additional, higher-magnification images of each candidate object using imager 212, with those zoomed-in images then being input to object classification module 126. In either case, object classification module 126 may classify objects using a CNN. In some embodiments, the CNN requires significantly more processing power and/or processing time than the model or algorithm applied by object detection module 124. The operation of object classification module 126, and embodiments in which higher-magnification images are captured and processed, are discussed in further detail herein.

Operation of system 100, according to some embodiments, will now be described with reference to FIG. 1 and FIGS. 2A through 2C. Initially, training server 106 trains ML model(s) 109 using data stored in a training database 130. ML model(s) 109 may include a first CNN implemented by cell colony detection module 122 and a second CNN implemented by object classification module 126, for example. Training database 130 may include a single database stored in a single memory (e.g., HDD, SSD, etc.), a single database stored across multiple memories, or multiple databases stored in one or more memories. For each different model within ML model(s) 109, training database 130 may store a corresponding set of training data (e.g., input/feature data, and corresponding labels). To train a CNN implemented by object classification module 126, for instance, training database 130 may include a large number of input data sets each corresponding to an image of an object, along with a label indicating a correct object classification for that image. To improve classification accuracy, the training data may include images containing a wide variety of object types (e.g., single cells, doublets, different types of debris, different types of wall aberrations, etc.), and/or images captured under a wide variety of conditions (e.g., lighting that produces various kinds of well wall shadows, etc.). The labels may represent classifications of the training images that were supplied by human analysts of the corresponding images. In some embodiments, training server 106 uses additional labeled data sets in training database 130 in order to validate the generated ML model(s) 109 (e.g., to confirm that a given one of ML model(s) 109 provides at least some minimum acceptable accuracy). Training server 106 then provides (e.g., via a remote download over network 108) ML model(s) 109 to computer system 104. In some embodiments, training server 106 also updates/refines one or more of ML model(s) 109 on an ongoing basis. For example, after ML model(s) 109 are initially trained to provide a sufficient level of accuracy, visual inspection system 102 or computer system 104 may provide additional images to training server 106 over time, and training server 106 may use supervised or unsupervised learning techniques to further improve the model accuracy.

Wells within well plate 204 of visual inspection system 102 (e.g., well 240 of FIGS. 2B and 2C) are at least partially filled, either automatically or manually, with a medium that includes suitable nutrients for cells (e.g., amino acids, vitamins, etc.), growth factors, and/or other ingredients. For example, each of the wells may be at least partially filled. In some embodiments and/or scenarios, an attempt is made to inoculate each well with one, and only one, clone/cell. For example, a flow cytometry technique such as a fluorescence-activated cell sorting (FACS) technique may be used to inoculate each of the wells with a single clone.

Well plate 204 is then loaded onto stage 202, and VIS control module 120 causes visual inspection system 102 to move stage 202 in small increments (e.g., in the x and/or y directions), and to activate imager 210 (and possibly illumination system 208) in a synchronized manner, such that imager 210 captures at least one image for each of the wells. This initial image of each well may be captured very shortly after inoculation during the first day of incubation, and may depict the entire area of each well (e.g., from a bottom-up view). Visual inspection system 102 may store each well image locally, or may immediately transfer each image to computer system 104 (e.g., for storage in memory unit 114).

The process of imaging the wells may be repeated at regular or irregular intervals, depending on the embodiment. For example, VIS control module 120 may cause visual inspection system 102 to image each one of the wells once per day over some predefined incubation period (e.g., 10 days, 14 days, etc.), or once per week, etc. Alternatively, the wells may be imaged only at the beginning and end of the incubation period (e.g., at day one and day 14 of a 14-day incubation period). Either as the well images are generated, or in batches after subsets (or all) of the images have been generated, visual inspection system 102 sends the images to computer system 104 for automated analysis. As with the process of capturing well images, the process of transferring images to computer system 104 may be automated (e.g., triggered by commands from VIS control module 120).

Generally, application 118 attempts to detect cell colonies within the images of the wells, and then, for each detected colony, discern whether the colony formed from only a single clone/cell. To this end, cell colony detection module 122 (e.g., using a CNN that is a copy of one of ML model(s) 109) may analyze each of the well images from the end of the incubation period. For each colony that colony detection module 122 detects in a given well, object detection module 124 may analyze the first-day image of that same well to detect any objects therein. However, object detection module 124 may not be capable of accurately distinguishing single cells from debris, well wall aberrations, and/or other objects, either generally or in the presence of certain conditions (e.g., shadows from the well wall). Thus, for each "candidate" object identified by object detection module 124, object classification module 126 instead attempts to classify the object. As noted above, object classification module 126 may use any suitable classification scheme, so long as the classification reveals whether the depicted object is, or is not, a single cell (or a single living cell). In some embodiments, object classification module 126 accomplishes its classification task by using a CNN (a copy of one of ML model(s) 109) to process a specific portion of the well image that was already analyzed by object detection module 124. For example, object classification module 126 may apply, as an input to the CNN, just those pixels that correspond to a candidate object (and possibly also a small surrounding area), with the CNN output being the predicted class/type for that candidate object.

In other embodiments, however, the resolution of the images analyzed by object detection module 124 is simply not sufficient to provide high-accuracy classification of candidate objects. Accordingly, in these embodiments, VIS control module 120 may cause visual inspection system 102 to capture one or more additional images of at least some of the wells shortly after inoculation on the first day of incubation. For example, for a given one of the wells, visual inspection system 102 may send the initial, "day one" image to computer system 104 when that image is captured, and object detection module 124 may analyze the image for candidate objects shortly thereafter. For each candidate object detected within the image/well, VIS control module 120 may cause visual inspection system 102 to shift stage 202 a small amount such that the candidate object is in the optical path of the higher-magnification imager 212, for example roughly centered in this optical path. To properly adjust the position of stage 202, the position of each candidate object within the well may be determined based on the image of the entire well (i.e., the "day one" image that was processed by object detection module 124). Visual inspection system 102 sends each higher-magnification image to computer system 104, where object classification module 126 processes/analyzes the object image using the CNN to classify the depicted candidate object.

The CNN used by object classification module 126 (and possibly, a CNN used by cell colony detection module 122) may include any suitable number of convolutional layers for two-dimensional convolution (e.g., to detect features such as edges within images), any suitable number of pooling layers (e.g., a down-sampling layer, to reduce computation while preserving the relative locations of features), and any suitable number of fully-connected layers (e.g., to provide high-level reasoning based on features). Alternatively (e.g., if visual inspection system 102 implements three-dimensional imaging techniques), the CNN of object classification module 126 may utilize three-dimensional convolution to detect features in three dimensions. Regardless of whether a two- or three-dimensional CNN is used, the CNN may also provide, for each prediction/classification, a probability indicative of how likely it is that the prediction/classification is accurate. In some embodiments, object classification module 126 defaults to a particular classification (e.g., "unknown," or "not single cell," etc.) if an object in a given image cannot be classified with at least a threshold probability/confidence level.

Application 118 may determine whether a given well sample should be discarded, or advanced to a next stage of cell line development, based on whether a cell colony in the sample/well formed from a single clone. Depending on the embodiment, however, the determination of whether the colony formed from a single clone may involve more than detecting a single cell within the sample/well. For example, application 118 may conclude that a colony formed from a single clone only if both (1) object classification module 126 classifies a candidate object in the well as a single cell, and (2) the position of that single cell within the well overlaps (or is within a threshold distance of, etc.) the position of the colony within the well. Various other ways in which the determination may be made are discussed herein. It is understood that a conclusion that a cell colony did not form/develop from a single cell may mean that there is positive visual evidence that the colony formed from two or more cells, or may mean that there is simply not sufficient visual evidence to confidently determine how the colony formed.

Application 118 may cause a user interface to display an indication of whether a given well sample should be discarded or advanced to the next development stage, and/or may communicate with another application and/or computer system to trigger an automated discard or cell line development stage, for example. The cell line development may be for any suitable purpose, depending on the embodiment and/or scenario. For example, the cell line may be used to develop antibodies or hybrid molecules for a biopharmaceutical product (e.g., bispecific T cell engager (BITE®) antibodies, such as for BLINCYTO® (blinatumomab), or monoclonal antibodies, etc.), or may be used for research and/or development purposes.

Figure 3:
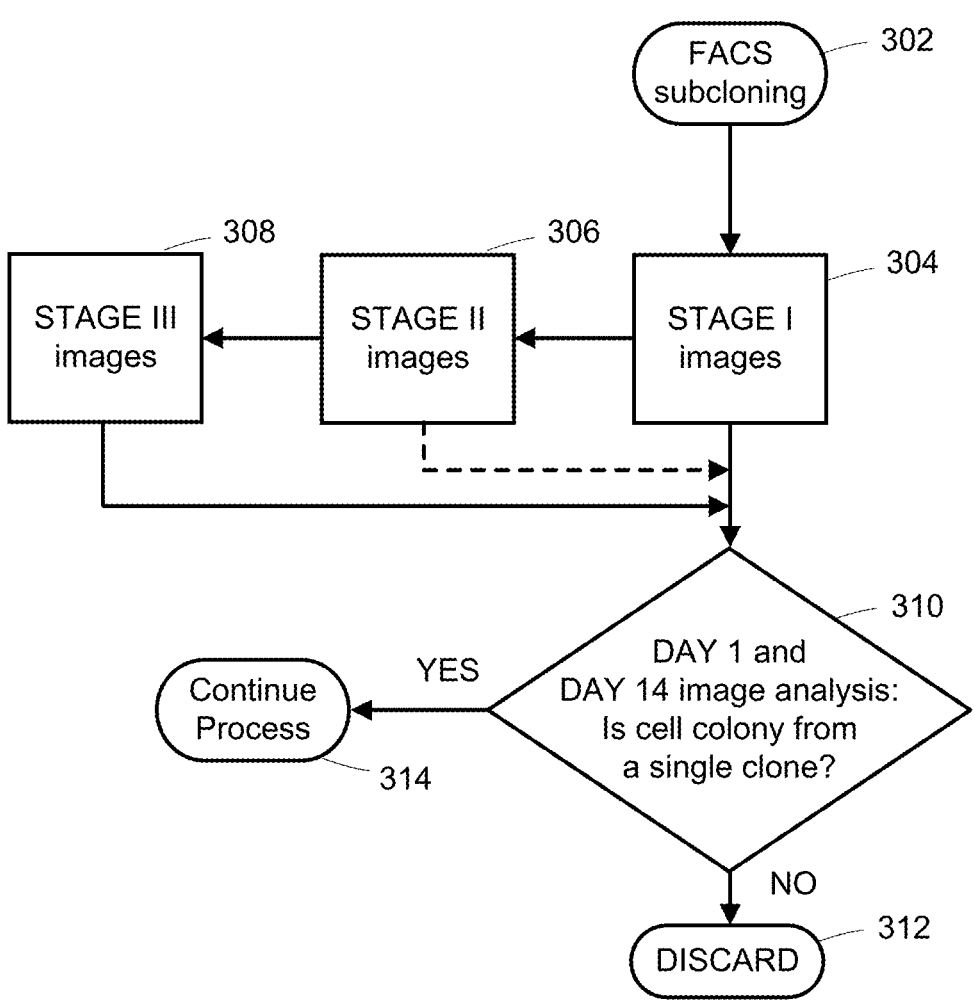
FIG. 3 is a flow diagram of an example process for determining whether to use or discard a well sample.

FIG. 3 is a flow diagram of an example process 300 for determining whether to use or discard a sample in a well. The process 300 may be implemented, and (in some embodiments) fully automated, by system 100 of FIG. 1, for example. In the example process 300, at a preliminary stage 302, FACS subcloning is used to inoculate individual wells (e.g., wells within well plate 204) with clones (cells). During an initial stage 304 of the incubation period (referred to for conciseness as "DAY 1," though it will be appreciated that the initial stage 304 may occur during other time periods immediately following inoculation), at least one image of each well is generated (e.g., by imager 210 of visual inspection system 102, as controlled by VIS control module 120). The "DAY 1" images may be captured at the beginning of the first incubation day (e.g., very soon after inoculating the wells).

At subsequent stage 306, at least one additional image of each well is generated (e.g., by imager 210), at roughly the midpoint of the incubation period (referred to for conciseness as "DAY 7," though it will be appreciated that the rough midpoint may occur during other time periods, for example within days 5-7, 5-8, 5-9, 6-7, 6-8, 6-9, 7-8, or 7-9). In some embodiments, stage 306 may occur earlier or later, stage 306 may be omitted, or the process 300 may include additional stages in which well images are generated (e.g., one per day, or every other day, etc.). Turning to stage 308, still another image (or another set of images) of each well is generated (e.g., by imager 210), at the end of the incubation period (referred to for conciseness as "DAY 14," though it will be appreciated that the end of the incubation period may be at a different period of time). In some embodiments, the incubation period is longer or shorter than 14 days.

In FIG. 3, stages 310, 312 and 314 represent the operations that occur for each sample/well. At stage 310, at least the stage 304 and stage 308 (e.g., "DAY 1" and "DAY 14") images are analyzed to determine whether a cell colony is in the well and, if so, whether that colony formed from a single clone. Stage 310 may include the operations of cell colony detection module 122, object detection module 124 and object classification module 126 as described above, for example. Stage 310 may occur entirely after stage 308, or may also occur at other times during the process 300. As discussed above in connection with FIG. 1, for example, it may be necessary to analyze at least some well images at an initial stage 304 (e.g., immediately after inoculation, such as on the first day of incubation). Thus, stage 310 may include object detection that occurs in parallel with stage 304, and stage 304 may further include obtaining additional, zoomed-in images of each detected candidate object (e.g., using imager 212). In these embodiments, analysis of each candidate object (e.g., by object classification module 126) may occur in parallel with (or shortly after) stage 304, or may occur after stage 308, etc. In some embodiments, stage 310 also includes analysis of the "DAY 7" images generated at stage 306. For example, stage 310 may determine whether a particular cell colony formed from a single clone not only by identifying a single clone in the well, but also by analyzing the "DAY 7" image of the well to detect a colony at an intermediate growth stage.

If it is not determined at stage 310 that a particular cell colony was formed from a single clone (e.g., if it cannot be determined with sufficient confidence that the colony formed from a single clone), flow proceeds to stage 312 where the corresponding sample is discarded. Conversely, if it is determined at stage 314 that the colony was formed from a single clone, flow proceeds to stage 314, where the corresponding sample is forwarded to the next stage of a cell line development process. For example, a cell of the sample (e.g., as part of a portion of the sample comprising the cell) may be transported to a new culture environment and cultured. Information on cell culture can be found, for example, in Green and Sambrook, "Molecular Cloning: A Laboratory Manual" (4th edition) Cold Spring Harbor Laboratory Press 2012, which is incorporated by reference herein in its entirety.

Figure 4:
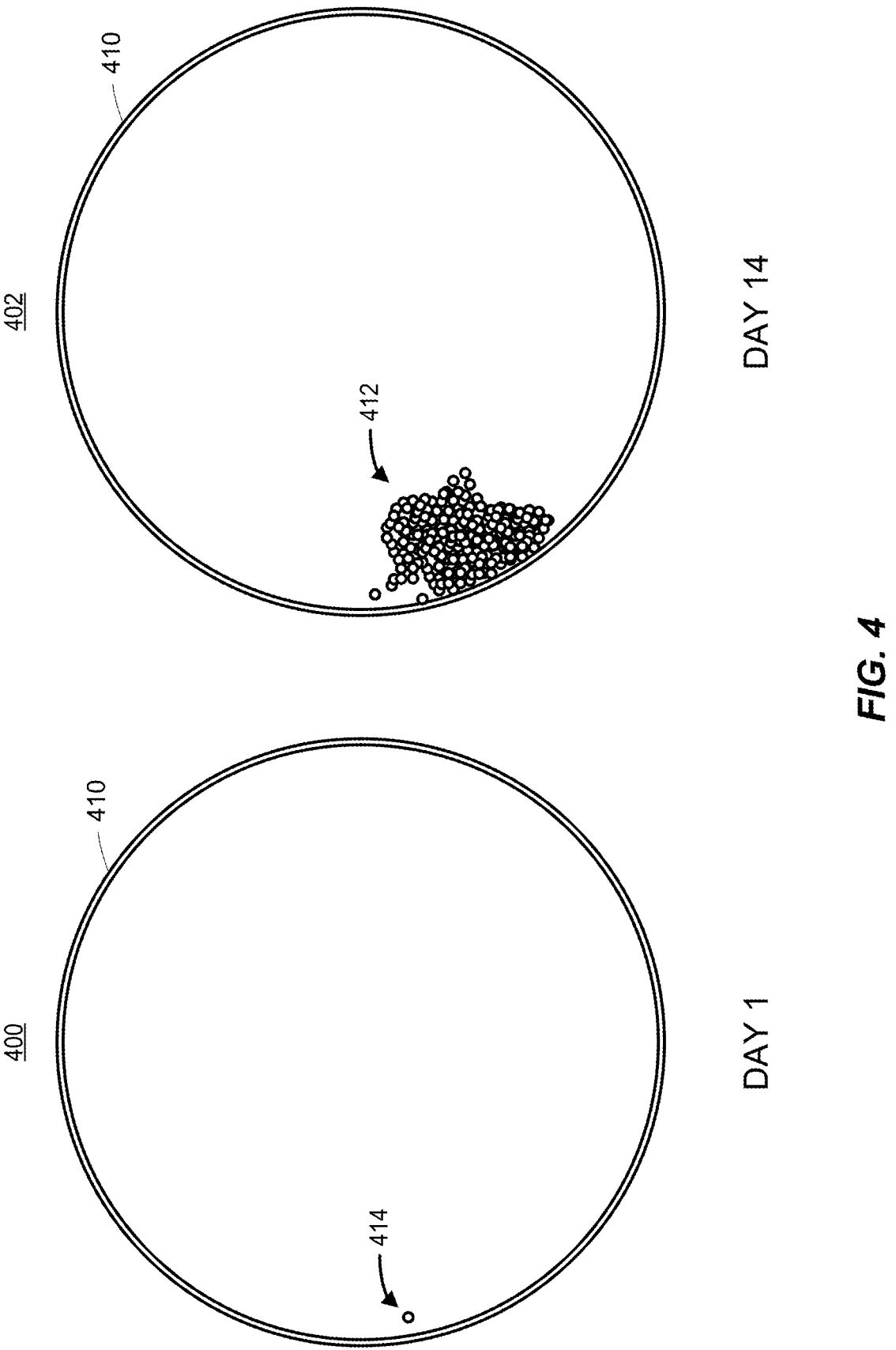
FIG. 4 depicts an example embodiment and scenario in which well images are generated by a visual inspection system at two different times.

FIG. 4 depicts an example scenario in which images 400, 402 of a well 410 (e.g., one of the wells in well plate 204) are generated by a visual inspection system (e.g., visual inspection system 102) at two different times. Specifically, a first image 400 of well 410 is captured shortly after inoculation of well 410 (e.g., at stage 304 of process 300), while a second image 402 of well 410 is captured at the end of the incubation period (e.g., at stage 308 of process 300). Images 400 and 402 may be captured by imager 210, for example. Each of images 400, 402 represents a bottom-up perspective of well 410, and depicts the entirety of the contents of well 410. It is understood that, in some embodiments, the well images 400, 402 also include some area outside the periphery of well 410 (e.g., if the images are rectangular).

Referring back to FIG. 1, cell colony detection module 122 of application 118 analyzes image 402 (e.g., using a CNN) on or after the end of the incubation period (e.g., at stage 308 of process 300), and detects a cell colony 412 within well 410. In some embodiments, in response to detecting cell colony 412, application 118 may use object detection module 124 to analyze image 400 (e.g., using OpenCV) for the purpose of detecting any candidate objects within well 410 at the start of incubation. As seen in the example scenario of FIG. 4, image 400 depicts only a single object 414 within well 410. Thus, object detection module 124 outputs an indication of only a single candidate object. Application 118 may then extract the image pixels corresponding to object 414, and provide that image portion as input to object classification module 126 (e.g., another CNN), which analyzes the image portion to classify object 414 (e.g., as a single cell, or a doublet, debris, etc.).

In some embodiments, as discussed herein, accurate classification may comprise higher magnification of candidate objects. In such embodiments, application 118 may analyze image 400 shortly after image 400 is generated (e.g., shortly after inoculation). In particular, object detection module 124 may analyze image 400 to detect object 414 and, in response, VIS control module 120 may cause stage 202 to move such that object 414 is roughly centered in the optical path of a higher-magnification imager (e.g., imager 212), and cause that imager to capture a zoomed-in image of object 414 (not shown in FIG. 4) shortly after image 400 was captured. Object classification module 126 may then analyze the zoomed-in image to classify object 414. Later, on or after the end of the incubation period (e.g., at stage 308 of process 300, such as on or after day 14), cell colony detection module 122 analyzes image 402 and detects cell colony 412.

Regardless of the timing with which cell colony 412 is detected and object 414 is classified, the classification (and possibly the positions of colony 412 and object 414 within well 410) may be used to determine whether colony 412 had formed from a single clone. In alternative scenarios where object detection module 124 detects multiple candidate objects in image 400, object classification module 126 may also analyze images of the remaining candidate objects to determine whether any one or more of those objects is a single cell.

If no object in image 400 is classified as a single cell, application 118 may conclude that cell colony 412 did not form from a single clone. Conversely, if object 414 (or another object in image 400) is classified as a single cell, application 118 may determine that cell colony 412 did form from a single clone. In some embodiments, however, this latter determination may also be based on one or more other factors. For example, application 118 may determine that cell colony 412 formed from a single clone only if the position of object 414 within well 410 overlaps a position of cell colony 412 within well 410. As another example, application 118 may determine that cell colony 412 formed from a single clone only if (1) the position of object 414 within well 410 overlaps a position of cell colony 412 within well 410, and (2) no other candidate objects in image 400 are classified as cells (e.g., as single cells or as doublets).

In some embodiments, one or more intermediate well images are used to determine or confirm that a cell colony developed from a single clone. One such embodiment is discussed now with reference to FIG. 5, which depicts an example embodiment and scenario in which images 500, 502, 504 of a well 510 are generated by a visual inspection system (e.g., visual inspection system 102) at three different times. Specifically, a first image 500 of well 510 is captured shortly after inoculation of well 510 (e.g., at stage 304 of process 300), a second image 502 of well 510 is captured around the mid-point of the incubation period (e.g., at stage 306 of process 300), and a third image 504 of well 510 is captured at the end of the incubation period (e.g., at stage 308 of process 300). Images 500, 502 and 504 may be captured by imager 210, for example. Each of images 500, 502, 504 represents a bottom-up perspective of well 510, and depicts the entirety of the contents of well 510. As with the images 400, 402 of FIG. 4, it is understood that, in some embodiments, the images 500, 502, 504 may also include some area outside the periphery of well 510.

Referring back to FIG. 1, cell colony detection module 122 of application 118 analyzes image 504 (e.g., using a CNN) on or after the end of the incubation period (e.g., at stage 308 of process 300), and detects a cell colony 520 within well 510. In some embodiments, in response to detecting cell colony 520, application 118 may use object detection module 124 to analyze image 500 (e.g., using OpenCV) for the purpose of detecting any candidate objects within well 510 at the start of incubation. As seen in the example scenario of FIG. 5, image 500 depicts only a single object 522 within well 510. Thus, object detection module 124 outputs an indication of only a single candidate object. Application 118 may then extract the image pixels corresponding to object 522, and provide that image portion as input to object classification module 126 (e.g., another CNN), which analyzes the image portion to classify object 522 (e.g., as a single cell, or a doublet, debris, etc.).

In some embodiments, as discussed herein, accurate classification may comprise higher magnification of candidate objects. In such embodiments, application 118 may analyze image 500 shortly after image 500 is generated (e.g., shortly after inoculation, such as stage 304 of process 300). In particular, object detection module 124 may analyze image 500 to detect object 522 and, in response, VIS control module 120 may cause stage 202 to move such that object 522 is at least roughly centered in the optical path of a higher-magnification imager (e.g., imager 212), and cause that imager to capture a zoomed-in image of object 522 (not shown in FIG. 4). Object classification module 126 may then analyze the zoomed-in image to classify object 522. Later, on or after the end of the incubation period (such as stage 308 of process 300), cell colony detection module 122 analyzes image 504 and detects cell colony 520.

Regardless of the timing with which cell colony 520 is detected and object 522 is classified, the classification (and possibly the positions of colony 520 and object 522 within well 510) may be used to determine whether colony 520 had formed from a single clone. As described above, the presence of other candidate objects in the image 500, and their classifications by object classification module 126, may also factor into that determination. In addition, in this embodiment, application 118 analyzes image 502. For example, cell colony detection module 122 may analyze image 502 (e.g., using the same CNN used to analyze image 504) to detect colony 524. Thereafter, application 118 may compare the position of colony 524 to the position of object 522 and/or the position of cell colony 520, and/or may compare the size of colony 524 (e.g., the pixel width, or total number of pixels, etc., corresponding to colony 524 within image 502) to the size of colony 520 (e.g., the pixel width, or total number of pixels, etc., corresponding to colony 520 within image 504). In one example embodiment, application 118 determines that cell colony 520 formed from a single clone only if (1) the position of colony 524 within well 510 overlaps the position of colony 520 within well 510, and (2) the size of colony 524 is smaller than the size of colony 520.

Figure 5:
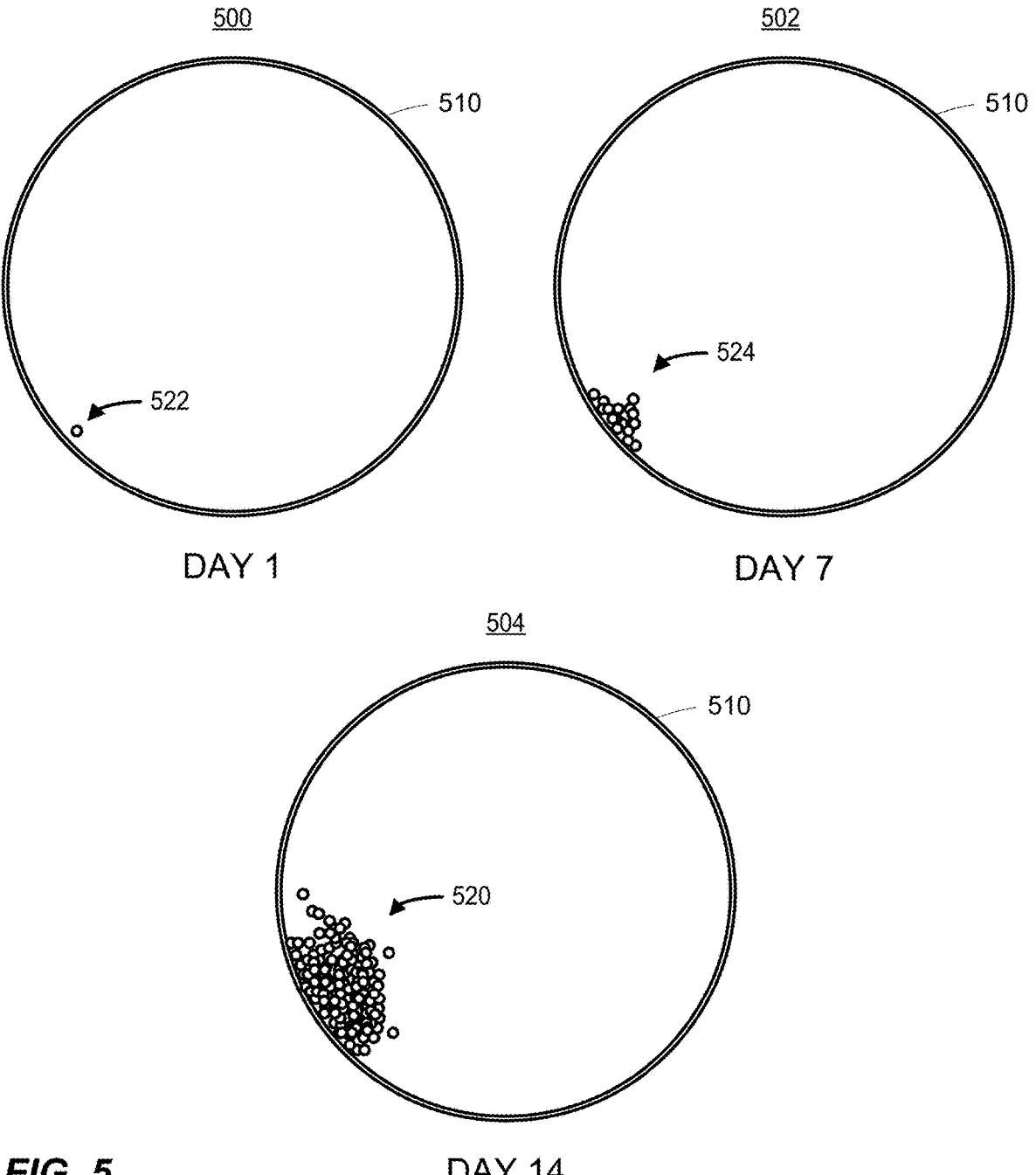
FIG. 5 depicts an example embodiment and scenario in which well images are generated by a visual inspection system at three different times.

It is understood that FIGS. 4 and 5 are provided for purposes of illustration, and that other numbers of images (e.g., four, five, ten, etc.) may be analyzed, and/or images from different days within the incubation period may be analyzed, to determine whether a cell colony formed from a single clone. Moreover, algorithms other than those discussed above may instead, or also, be used to determine whether a cell colony formed from a single clone. For example, a sequence of other image processing functions (e.g., intensity thresholding, blob analysis, and subsequent binary morphology operators) could instead or additionally be used to determine whether a cell colony formed from a single clone.

Figure 6:
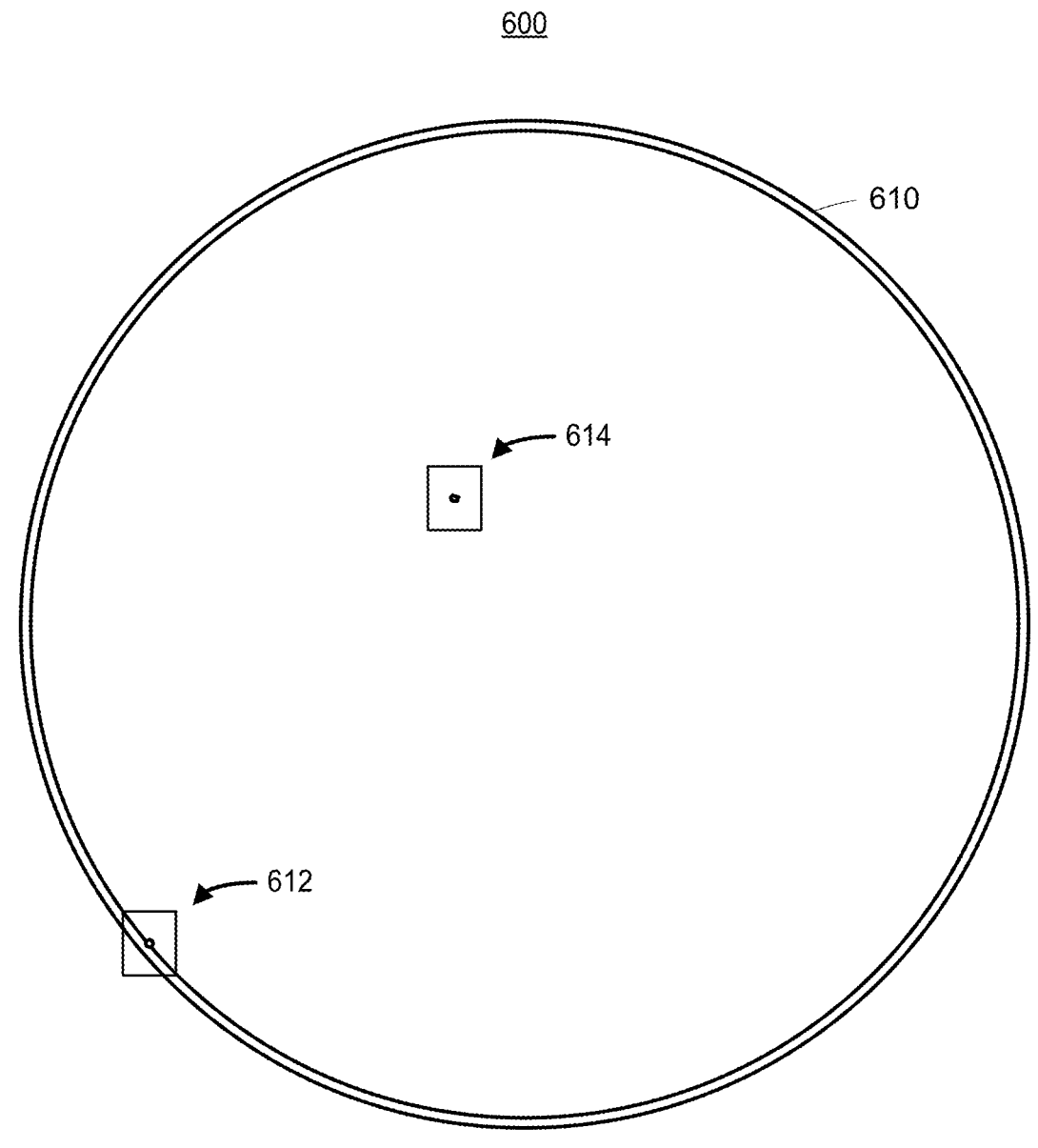
FIG. 6 depicts an embodiment and scenario in which a number of candidate objects have been identified in a well image.
Figure 7:
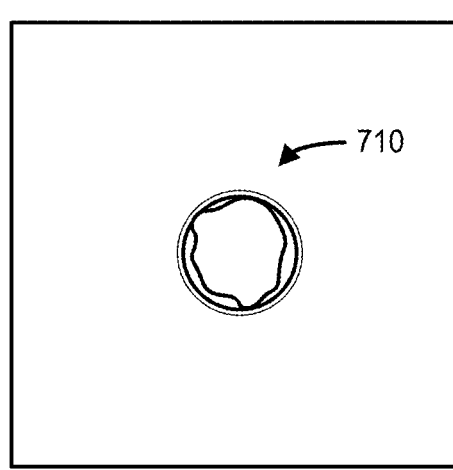
FIG. 7 depicts example zoomed-in images of candidate objects.
Figure 7:
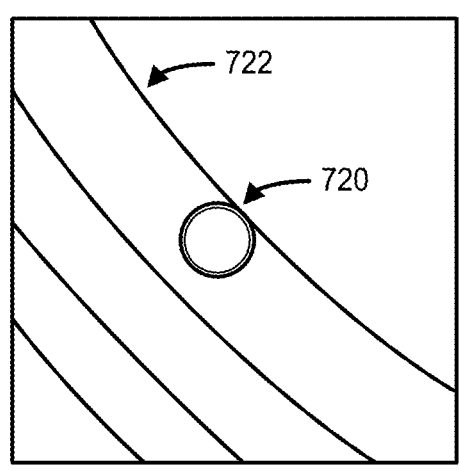
Figure 7:
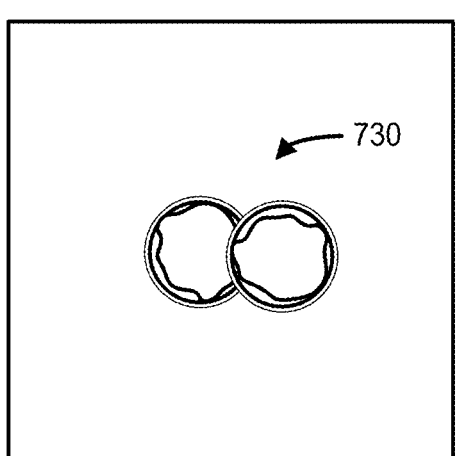
Figure 7:
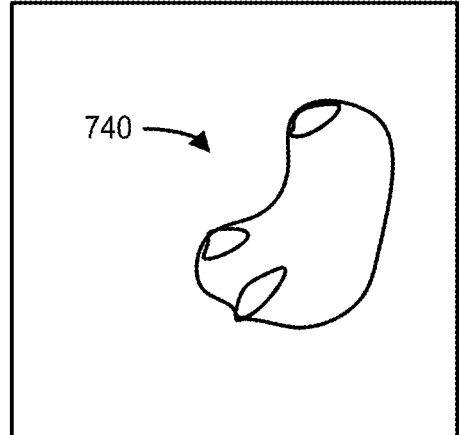

FIGS. 6 and 7 correspond to an example embodiment and scenario in which multiple candidate objects are detected, and in which zoomed-in images of those objects are obtained for more accurate classification. Referring first to FIG. 6, an image 600 (which may be an entire image, or only a portion of an image) depicts a well 610 (e.g., one of the wells within well plate 204). Image 600 may have been captured by imager 210, for example. In the image 600, object detection module 124 has detected a first candidate object 612 and a second candidate object 614. The rectangles surrounding objects 612, 614 merely signify that those objects have been detected, and may or may not actually be generated or displayed on any user interface.

Because application 118 cannot, in this particular example, accurately classify objects 612, 614 based on image 600 (or at least, cannot accurately classify objects of similar size on a sufficiently consistent basis), VIS control module 120 may be configured to cause visual inspection system 102 to capture zoomed-in images of objects 612, 614 (e.g., using imager 212). FIG. 7 depicts various example zoomed-in images 700, 702, 704, 706, any one of which may correspond, for example, to one of candidate objects 612, 614. Specifically, image 700 is a high-magnification image of a single cell 710, image 702 is a high-magnification image of an aberration 720 within a well wall 722, image 704 is a high-magnification image of a doublet 730, and image 706 is a high-magnification image of debris 740. Object classification module 126 may use a CNN that is trained to classify objects according to all of these classes, some of these classes (e.g., "single cell" versus "other"), and/or one or more other classes (e.g., "empty cell," "bubble," etc.).

FIG. 8 is a flow diagram of an example method 800 for facilitating clone selection (e.g., for a cell line development process). Method 800 may be implemented by one or more portions of system 100 (e.g., visual inspection system 102 and computer system 104) or another suitable system. As a more specific example, block 802 of method 800 may be implemented by visual inspection system 102 of FIGS. 1 and 2, while blocks 804 through 812 may be implemented by computer system 104 (e.g., by processing unit 110 when executing instructions stored in memory unit 114).

At block 802 of method 800, a plurality of time-sequence images of a well containing a medium are generated by a first imaging unit (e.g., by imager 210). The medium may contain cell nutrients, growth factors, etc., and was previously inoculated (e.g., using a flow cytometry technique such as a FACS technique). The generated images include at least a first time-sequence image generated at a first time (e.g., shortly after inoculation, such as during the first day of an incubation period), and a second time-sequence image generated at a second, later time (e.g., on the last day of the incubation period). The plurality of images may also include one or more additional time-sequence images that are generated at times between the first and second time-sequence images.

At block 804, the first time-sequence image is analyzed (e.g., using OpenCV and/or some other suitable object detection and/or segmentation software) to detect one or more candidate objects depicted in the first time-sequence image. Block 804 may include detecting only objects that are within the depicted well and below some maximum size (e.g., number of pixels). Block 804 may or may not include segmenting the first time-sequence image to identify which image pixels correspond to the object, depending on the embodiment.

At block 806, for each candidate object detected at block 804, an image of the candidate object is analyzed, using a CNN, to determine whether the candidate object is a single cell. If segmenting of the candidate objects was performed at block 806, for example, block 806 may include analyzing the set of pixels that corresponds to each candidate object. Alternatively, method 800 may further include, for each candidate object detected at block 804, generating a zoomed-in image of a portion of the well that contains the candidate object, in which case block 806 may include analyzing each zoomed-in image using the CNN. The zoomed-in image(s) may be generated using a second, higher-magnification imaging unit, such as imager 212. Generating the zoomed-in image(s) may comprise shifting the well (e.g., by moving a stage on which a well plate containing the well is disposed) such that the well is aligned with an optical path of the second imaging unit, for example.

Regardless of which type of image is analyzed (e.g., a segmented image portion or a new, zoomed-in image), the CNN employed at block 804 may be configured/trained to classify objects according to different possible object types, including at least one type corresponding to a single cell (or a single living cell, etc.). For example, the CNN may classify a given object as one of "single cell," "doublet," and "debris," or as one of "single cell" and "other," etc.

In some embodiments, blocks 804 and 806 occur after block 802 has been completed. In other embodiments, blocks 804 and 806 occur before the second time-sequence image is generated at block 802. For example, blocks 804 and 806 may occur almost immediately after the first time-sequence image is generated at block 802.

At block 808, the second time-sequence image is analyzed to detect a cell colony depicted therein. The second time-sequence image may be analyzed using a CNN (e.g., a different CNN than the one used at block 806), for example, or using one or more other image processing functions (e.g., intensity thresholding, blob analysis, binary morphology operators, etc.). In various embodiments, block 808 may occur a number of days after blocks 804 and 806 (e.g., if blocks 804 and 806 occurred shortly after the first time-sequence image was generated), or shortly after blocks 804 and 806 (e.g., if all image analysis occurs after block 802 is complete). In other embodiments, however, blocks 804 and 806 occur after (e.g., in response to) the determination made at block 808. That is, a system implementing method 800 may attempt to detect a single cell in a well if, and only if, a cell colony has already been detected in the well.

At block 810, it is determined whether the cell colony detected at block 808 was formed from only one cell, based at least in part on the determination(s) made at block 806 (i.e., based at least on whether each of the one or more candidate objects is a single cell). For example, it may be determined at block 810 that the colony did not form from a single cell if the candidate object(s) include two or more cells, or if no object among the candidate objects is a living, single cell, etc. It is understood that a conclusion that the colony did not form from a single cell may mean that there is positive visual evidence that the colony formed from two or more cells, or that there is simply not sufficient visual evidence to determine how the colony formed.

In some embodiments, the determination at block 810 is also based on one or more other factors. If it was determined at block 806 that a first candidate object in the first time-sequence image is a single cell, for example, block 810 may include comparing a position of that candidate object within the well to a position of the cell colony within the well. Additionally or alternatively, if a third time-sequence image was generated at a time between the first and second time-sequence images, and if it was determined at block 806 that a first candidate object in the first time-sequence image is a single cell, block 810 may include analyzing the third time-sequence image to determine whether that candidate object developed into the cell colony. For example, an intermediate colony may be detected within the third time-sequence image, and the cell count, size and/or position of the intermediate colony may be analyzed and compared to the cell count, size and/or position of the cell colony detected in the second time-sequence image.

At block 812, output data are generated. The output data indicate whether the cell colony was formed from only one cell, in accordance with the determination made at block 810. The output data may be displayed to a user on a user interface of a computing device, for example, and/or may be sent to one or more other software modules and/or computer systems. In some embodiments, the output data signals to a user, or to one or more software modules or systems, that the well containing the cell colony should be selected for one or more additional stages of cell line development (if it was determined at block 810 that the colony was formed from only one cell), or that the well contents should be discarded (if it was determined at block 810 that the colony was not formed from only one cell). In some embodiments, method 800 further includes using the contents of the well to develop a cell line (e.g., for producing a biopharmaceutical product, or for research and development, etc.), for example by transferring a cell from the well to a new culture environment and culturing the cell in the new culture environment, or further includes discarding the well contents, based on the output data.

Although the systems, methods, devices, and components thereof, have been described in terms of exemplary embodiments, they are not limited thereto. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent that would still fall within the scope of the claims defining the invention.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for facilitating clone selection, the method comprising:

generating, by a first imaging unit, a plurality of time-sequence images of an entirety of a well containing a medium, the plurality of time-sequence images including a first time-sequence image generated at a first time after inoculation and a second time-sequence image generated at a second time later than the first time;

detecting, by one or more processors analyzing the first time-sequence image, one or more candidate objects depicted in the first time-sequence image;

for each of the one or more candidate objects detected in the first time-sequence image, determining whether the candidate object is a single cell by the one or more processors analyzing an image of the candidate object using a convolutional neural network to classify the candidate object as one of a plurality of possible object types, the plurality of object types including a first type corresponding to a single cell and a second type corresponding to at least one of debris, a well wall aberration, or a shadow, wherein the image of the candidate object comprises a set of pixels depicting the candidate object generated at a time after inoculation;

detecting, by the one or more processors analyzing the second time-sequence image, a cell colony depicted in the second time-sequence image;

determining, by the one or more processors, whether the cell colony was formed from only one cell based at least in part on whether each of the one or more candidate objects was determined to be a single cell; and generating, by the one or more processors, output data indicating whether the cell colony was formed from only one cell.

2. The method of claim 1, wherein:

the method comprises determining, using the convolutional neural network, that a first candidate object of the one or more candidate objects is a single cell; and determining whether the cell colony was formed from only one cell further comprises comparing a position of the first candidate object within the well to a position of the cell colony within the well.

3. The method of claim 1, wherein:

the plurality of time-sequence images further includes a third time-sequence image generated at a third time between the first time and the second time;

the method comprises determining, using the convolutional neural network, that a first candidate object of the one or more candidate objects is a single cell; and determining whether the cell colony was formed from only one cell further comprises determining, by analyzing at least the third time-sequence image, whether the first candidate object developed into the cell colony.

4. The method of claim 3, wherein determining whether the first candidate object developed into the cell colony includes determining whether the third time-sequence image depicts an intermediate cell colony having one or both of (i) a smaller cell count than the cell colony, or (ii) a smaller size than that cell colony.

5. The method of claim 4, wherein determining whether the first candidate object developed into the cell colony includes (i) determining that the third time-sequence image depicts the intermediate cell colony, and (ii) comparing a position of the intermediate cell colony within the well to a position of the cell colony within the well and/or a position of the first candidate object within the well.

6. The method of claim 1, wherein:

the first imaging unit generates the plurality of time-sequence images at a first magnification level;

the method further comprises, for each of the one or more candidate objects depicted in the first time-sequence image, generating, by a second imaging unit providing a second magnification level greater than the first magnification level, a zoomed-in image of a portion of the well that contains the candidate object; and determining whether the candidate object is a single cell includes determining, by analyzing the zoomed-in image using the convolutional neural network, whether the candidate object is a single cell.

7. The method of claim 6, wherein generating the zoomed-in image includes shifting the well such that the well is aligned with an optical path of the second imaging unit.

8. The method of claim 1, wherein detecting the cell colony depicted in the second time-sequence image includes processing the second time-sequence image using another convolutional neural network.

9. The method of claim 1, wherein:

the method comprises determining that the cell colony was formed from only one cell; and the method further comprises transporting a cell from the well to a new culture environment; and culturing the cell in the new culture environment.

10. The method of claim 1, wherein:

the method comprises determining that the cell colony was formed from only one cell; and the method further comprises using contents of the well to develop a cell line for producing a biopharmaceutical product.

11. The method of claim 1, wherein:

the method comprises determining that the cell colony was not formed from only one cell; and the method further comprises discarding contents of the well.

12. One or more non-transitory computer-readable media storing instructions that, when executed by one or more processors, cause the one or more processors to:

receive a plurality of time-sequence images of an entirety of a well containing a medium, the plurality of time-sequence images being generated by a first imaging unit, and including a first time-sequence image generated at a first time after inoculation and a second time-sequence image generated at a second time later than the first time;

detect, by analyzing the first time-sequence image, one or more candidate objects depicted in the first time-sequence image;

for each of the one or more candidate objects detected in the first time-sequence image, determine whether the candidate object is a single cell by analyzing an image of the candidate object using a convolutional neural network to classify the candidate object as one of a plurality of possible object types, the plurality of object types including a first type corresponding to a single cell and a second type corresponding to at least one of debris, a well wall aberration, a shadow, wherein the image of the candidate object comprises a set of pixels depicting the candidate object generated at a time after inoculation;

detect, by analyzing the second time-sequence image, a cell colony depicted in the second time-sequence image;

determine whether the cell colony was formed from only one cell based at least in part on whether each of the one or more candidate objects was determined to be a single cell; and generate output data indicating whether the cell colony was formed from only one cell.

13. The one or more non-transitory computer-readable media of claim 12, wherein the instructions cause the one or more processors to:

when determining that a first candidate object is a single cell, determine, by comparing a position of the first candidate object within the well to a position of the cell colony within the well, whether the first candidate object developed into the cell colony.

14. The one or more non-transitory computer-readable media of claim 12, wherein the plurality of time-sequence images further includes a third time-sequence image generated at a third time between the first time and the second time, and wherein the instructions cause the one or more processors to:

when determining whether the cell colony was formed from only one cell, determine, by analyzing at least the third time-sequence image, whether the first candidate object developed into the cell colony.

15. The one or more non-transitory computer-readable media of claim 12, wherein:

the plurality of time-sequence images being generated by the first imaging unit are generated at a first magnification level;

the instructions further cause the one or more processors to, for at least one of the one or more candidate objects, receive a zoomed-in image of a portion of the well that contains the candidate object, the zoomed-in image being generated at a second magnification level greater than the first magnification level; and the instructions cause the one or more processors to determine, by analyzing the zoomed-in image using the convolutional neural network, whether the candidate object is a single cell.

16. The one or more non-transitory computer-readable media of claim 15, wherein the zoomed-in image is generated by a second imaging unit, wherein the instructions further cause the one or more processors to instruct a stage comprising the well disposed thereon to align the well with an optical path of the second imaging unit.

17. The one or more non-transitory computer-readable media of claim 12, wherein the output data either (i) indicates that contents of the well can be used to develop a cell line for producing a biopharmaceutical product, or (ii) indicates that contents of the well should be discarded.

18. A system comprising:

a visual inspection system including a stage configured to accept a well plate, and a first imaging unit configured to generate images of wells within the well plate on the stage, wherein each image corresponds to a single well; and a computer system including one or more processors, and one or more memories storing instructions that, when executed by the one or more processors, cause the computer system to command the first imaging unit to generate a plurality of time-sequence images of an entirety of a well containing a medium, the plurality of time-sequence images including a first time-sequence image generated at a first time after inoculation and a second time-sequence image generated at a second time later than the first time, detect, by analyzing the first time-sequence image, one or more candidate objects depicted in the first time-sequence image, for each of the one or more candidate objects detected in the first time-sequence image, determine whether the candidate object is a single cell by analyzing an image of the candidate object using a convolutional neural network to classify the candidate object as one of a plurality of possible object types, the plurality of object types including a first type corresponding to a single cell and a second type corresponding to at least one of debris, a well wall aberration, or a shadow, wherein the image of the candidate object comprises a set of pixels depicting the candidate object generated at a time after inoculation, detect, by analyzing the second time-sequence image, a cell colony depicted in the second time-sequence image, determine whether the cell colony was formed from only one cell based at least in part on whether each of the one or more candidate objects was determined to be a single cell, and generate output data indicating whether the cell colony was formed from only one cell.

19. The system of claim 18, wherein the instructions cause the computer system to:

when determining that a first candidate object is a single cell, determine, by comparing a position of the first candidate object within the well to a position of the cell colony within the well, whether the first candidate object developed into the cell colony.

20. The system of claim 18, wherein the plurality of time-sequence images further includes a third time-sequence image generated at a third time between the first time and the second time, and wherein the instructions cause the computer system to:

when determining whether the cell colony was formed from only one cell, determine, by analyzing at least the third time-sequence image, whether the first candidate object developed into the cell colony.

21. The system of claim 18, wherein:

the first imaging unit is configured to generate the plurality of time-sequence images at a first magnification level;

the visual inspection system further comprises a second imaging unit configured to generate zoomed-in images of portions of the wells within the well plate;

the second imaging unit provides a second magnification level greater than the first magnification level;

the instructions further cause the computer system to, for each of at least one of the one or more candidate objects, command the second imaging unit to generate a zoomed-in image of a portion of the well that contains the candidate object; and the instructions cause the computer system to determine, by analyzing the zoomed-in image using the convolutional neural network, whether the candidate object is a single cell.

22. The system of claim 21, wherein the zoomed-in image is generated by a second imaging unit, wherein the instructions further cause the one or more processors to instruct the stage, causing the stage comprising the well disposed thereon to align the well with an optical path of the second imaging unit.

* * * * *